US012679710B2

(12) United States Patent
Qiu

(10) Patent No.: US 12,679,710 B2
(45) Date of Patent: Jul. 14, 2026

(54) MASON JAR SEALING DEVICE

(71) Applicant: Shenzhen Yingchuanghui Investment Co., Ltd., Shenzhen (CN)

(72) Inventor: Min Qiu, Shenzhen (CN)

(73) Assignee: Shenzhen Yingchuanghui Investment Co., Ltd., Shenzhen (CN)

( * ) Notice: Subject to any disclaimer, the term of this patent is extended or adjusted under 35 U.S.C. 154(b) by 0 days.

(21) Appl. No.: 19/178,740

(22) Filed: Apr. 14, 2025

(65) Prior Publication Data

US 2026/0159367 A1 Jun. 11, 2026

(30) Foreign Application Priority Data

Dec. 3, 2024 (CN) ......................... 202422968741.0

(51) Int. Cl.
*B67B 3/24* (2006.01)

(52) U.S. Cl.
CPC ...................................... *B67B 3/24* (2013.01)

(58) Field of Classification Search
CPC ...... B67B 3/24; B65D 53/02; B65D 81/2038; B65B 31/025
See application file for complete search history.

(56) References Cited

U.S. PATENT DOCUMENTS 2,436,849 A * 3/1948 Billetter .................... B67B 3/24 53/103
3,255,568 A * 6/1966 Kretschmer, Jr. ....... B65B 31/02 53/331.5
4,372,096 A * 2/1983 Baum ........................ B67B 3/24 53/103
4,660,355 A * 4/1987 Kristen ................. B65B 31/047 53/88
5,957,317 A * 9/1999 Lee .................... B65D 81/2038 220/240
6,264,054 B1 * 7/2001 Miyake .............. B65D 81/2038 220/23.91
6,662,831 B2 * 12/2003 Chen ........................ F04B 41/02 53/210
6,789,690 B2 * 9/2004 Nieh .................. B65D 81/2015 220/203.11
7,231,753 B2 * 6/2007 Patterson ................ B65B 31/06 53/512
2017/0275067 A1 * 9/2017 Massinello ............ B65D 51/32
2018/0251355 A1 * 9/2018 Alipour ...................... B67B 7/20
2024/0076172 A1 * 3/2024 Yao ........................... B67B 3/24
2024/0092513 A1 * 3/2024 Yao ....................... B65B 31/025

* cited by examiner

*Primary Examiner* — Andrew M Tecco
*Assistant Examiner* — Nicholas E Igbokwe

(57) ABSTRACT

Provided is a mason jar sealing device, including a main machine and an adapter component. The separation plate is provided in the main machine, a through hole is provided in the separation plate, the through hole is connected to an extraction tube of a vacuum pump, and the separation plate is provided with a peripheral bone and an inner peripheral bone arranged concentrically on a side of a sleeve. The adapter component includes a straight cylindrical bracket whose both ends are pluggably fixed in the sleeve. The device is adaptable to mason jars of two different mouth diameters, and when a bottle top used for sealing a mouth of a mason jar is stuck in the mason jar sealing device, the bottle top can be removed by hand without the help of a tool, which is convenient and safe to use.

9 Claims, 3 Drawing Sheets

MASON JAR SEALING DEVICE

CROSS-REFERENCE TO RELATED APPLICATIONS

This application claims to the benefit of priority from Chinese Application No. 2024229687410 with a filing date of Dec. 3, 2024, the content of the aforementioned applications, including any intervening amendments thereto, are incorporated herein by reference.

TECHNICAL FIELD

The present utility model relates to the technical field of vacuum devices, and more specifically, to a mason jar sealing device.

BACKGROUND

A mason jar is a glass jar with good sealing performance. To effectively block entry of air and moisture and maintain freshness of food in the jar, air in the jar is usually completely extracted by using an adapted mason jar sealing device to prolong storage time of the food in the jar. There are usually two types of mason jars: one having a body of a standard mouth diameter and one having a body of a wide mouth diameter. At present, a mason jar sealing device is usually used only for a mason jar of one mouth diameter. Therefore, a plurality of mason jar sealing devices are required to meet requirements of evacuating mason jars of different mouth diameters.

In view of the foregoing situation, an existing Chinese Patent Announcement No. CN216375472U discloses a mason jar vacuum adapter, including an adapter body. A barrier member is provided in the middle of the adapter body. The barrier member is used for separating the adapter body into a first cap body and a second cap body. The first cap body has a first cap-shaped internal cavity. The second cap body has a second cap-shaped internal cavity. Diameters of openings of the first cap body and the second cap body are different. The barrier member is provided with a through hole allowing the first cap-shaped internal cavity to be in communication with the second cap-shaped internal cavity. An annular protrusion is formed at a position corresponding to the through hole on each of two sides of the barrier member respectively facing the first cap-shaped internal cavity and the second cap-shaped internal cavity. The through hole is connected to an extraction tube of a vacant pumping device to perform vacuum pumping. The annular protrusion achieves a sealing function. A main body of such a mason jar vacuum adapter similar is separated by a barrier member into a first cap body and a second cap body, and an opening of the first cap body and an opening of the second cap body are two openings of different diameters, adaptable to mason jars of two different mouth diameters.

However, during an actual operation, vacuum sealing of a mason jar may fail. In this case, a position of a bottle top needs to be readjusted or a new bottle top needs to be used for replacement. Moreover, when such a mason jar vacuum adapter is used for vacuum pumping, a bottle top for sealing a mason jar may be directly stuck on the adapter body (that is, the first cap-shaped internal cavity or the second cap-shaped internal cavity), and it is difficult to remove the bottle top, whose prying requires use of a tool. However, due to a limited size, it is still relatively difficult to pry out the bottle top with a tool, and it is even prone to accidental injury of an operator.

SUMMARY

The present utility model provides a mason jar sealing device. The device is adaptable to mason jars of two different mouth diameters, and when a bottle top used for sealing a mouth of a mason jar is stuck in the mason jar sealing device, the bottle top can be removed by hand without the help of a tool, which is convenient and safe to use.

To resolve the foregoing technical problem, the following technical solution is adopted in the present utility model:

A mason jar sealing device is provided, including a main machine and an adapter component, where a separation plate is provided in the main machine, the separation plate has an accommodating cavity on one side and a sleeve on the other side, a vacuum pump is provided in the accommodating cavity, a through hole is provided in the separation plate, and the through hole is connected to an extraction tube of the vacuum pump, where the separation plate is provided with a peripheral bone and an inner peripheral bone arranged concentrically on the side of the sleeve, and the through hole is located within a range surrounded by the inner peripheral bone; the adapter component includes a straight cylindrical bracket whose both ends are pluggably fixed in the sleeve, a first opening and a second opening are respectively provided at the two ends of the bracket, an annular separator plate is provided in the bracket, and the first opening and the second opening are respectively located on two sides of the annular separator plate and can both be mounted at a mouth of a mason jar; and a first sealing structure is provided on the first opening, and a second sealing structure is provided on the second opening; when the first opening is inserted into the sleeve, the first sealing structure surrounds the peripheral bone, and the second sealing structure is in close contact with an external thread of the mouth of the mason jar; and when the second opening is inserted into the sleeve, the second sealing structure surrounds the inner peripheral bone, and the first sealing structure is in close contact with the external thread of the mouth of the mason jar.

Further, a size of an annular opening in the middle of the annular separator plate is slightly smaller than a size of a bottle top used for sealing the mouth of the mason jar.

Still further, a plurality of ribs at equal intervals are provided on two side surfaces of the annular separator plate, and the ribs are divergently provided to an outer periphery and centered on a center of the annular opening.

Preferably, the annular separator plate is provided with a first support member on a side of the first opening, the first sealing structure includes a first sealing ring, the first sealing ring is fixed to the first support member, and the first sealing ring is in close contact with an inner wall of the first opening; and when the first opening is inserted into the sleeve, the first sealing ring surrounds the peripheral bone, the separation plate, the peripheral bone, the first sealing ring, the first support member, and the annular separator plate jointly form a first cavity, and the first cavity is in communication with the annular opening.

Preferably, the annular separator plate is provided with a second support member on a side of the second opening, a mounting groove is formed between the second support member and an inner wall of the bracket, the second sealing structure includes a pressure retaining member and a second sealing ring, the pressure retaining member is provided in the mounting groove and in close contact with an inner wall of the second opening, and the second sealing ring is fixed to an inner wall of the pressure retaining member; and when the second opening is inserted into the sleeve, the second sealing ring surrounds the inner peripheral bone, the separation plate, the inner peripheral bone, the second sealing ring, the second support member, and the annular separator plate jointly form a second cavity, and the second cavity is in communication with the annular opening.

Preferably, the pressure retaining member includes a housing and a step provided on an inner side of the housing, the second sealing ring is provided with a groove, a sealing strip extends outward from a bottom of the groove, the second sealing ring is provided on the step, the groove has one side in close contact with the inner side of the housing and the other side surrounding the inner peripheral bone, and the sealing strip is embedded in the mounting groove together with an inner side of the step after coming in close contact therewith.

Preferably, an axial length of the straight cylindrical bracket is greater than a depth of insertion into the sleeve.

Optionally, a guide stopper is provided on an inner wall of the sleeve, a mounting rail is provided on an outer wall of the bracket, and the bracket is fixedly inserted into the sleeve through engagement between the mounting rail and the guide stopper.

Optionally, the mounting rail is provided with an inlet on an outer wall at each of the two ends of the bracket, a bend is provided in the middle of the mounting rail, and when the bracket is inserted into the sleeve, the guide stopper slides in along the inlet and rotates to and fixed at the bend.

Compared with the prior art, the mason jar sealing device of the present utility model is provided with an adapter component. The adapter component includes a straight cylindrical bracket whose both ends are pluggably fixed in a sleeve of a main machine. An annular separator plate is provided in the bracket. An opening is provided at each of the two ends of the bracket. The openings are respectively arranged on two sides of the annular separator plate. In addition, the openings at the two ends are each provided with a sealing structure. The sealing structure can be sealed with the sleeve. The two ends of the adapter component can both be mounted at a mouth of a mason jar, and parts connected to the main machine can form a sealed space. Therefore, mason jars of different mouth diameters can be sealed and evacuated. In addition, due to the arrangement of the annular separator plate in the straight cylindrical bracket of the adapter component, when a bottle top of a mason jar is stuck in the adapter component by an operational error, the bottle top can be directly removed from an opposite side of the annular separator plate by hand without the help of any tool, which is convenient and safe to use.

DETAILED DESCRIPTION

Figure 1:
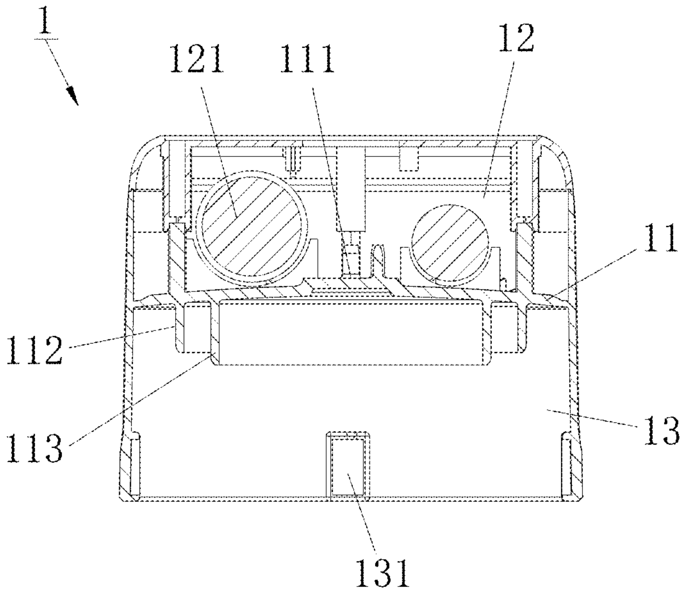
FIG. 1 is a schematic diagram of a main machine of a mason jar sealing device according to an embodiment of the present utility model.

The present utility model is further described below with reference to specific implementations. The accompanying drawings are merely used for exemplary description, are merely schematic diagrams rather than physical diagrams, and cannot be construed as a limitation to this patent. To better illustrate embodiments of the present utility model, some parts in the accompanying drawings may be omitted, enlarged, or reduced, which do not represent sizes of an actual product. It should be understood that orientation or position relationships indicated by the terms such as "upper", "lower", "left", "right", "top", "bottom", "inner", and "outer" are based on the orientation or position relationships shown in the drawings, for ease of the description of the present utility model and simplifying the description only, rather than indicating or implying that the indicated device or element must have a particular orientation or be constructed and operated in a particular orientation. Therefore, the terms for describing the positional relationships in the drawings are used only for illustrative purposes and should not be construed as limitations on this patent. In addition, some of the terms may be used for expressing other meanings besides representing an orientation or a position relationship. For example, the term "on" may also be used for representing a dependency relationship or a connection relationship in some cases. It may be understood by a person skilled in the art that some well-known structures in the accompanying drawings and descriptions thereof may be omitted.

Embodiment 1

Figure 2:
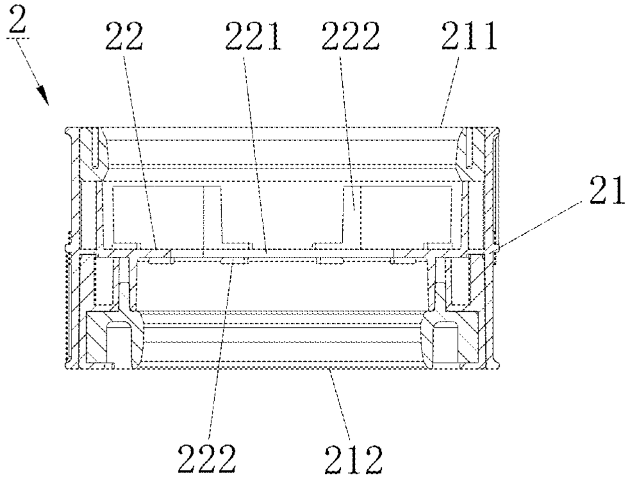
FIG. 2 is a schematic diagram of an adapter component of the mason jar sealing device according to an embodiment of the present utility model.
Figure 3:
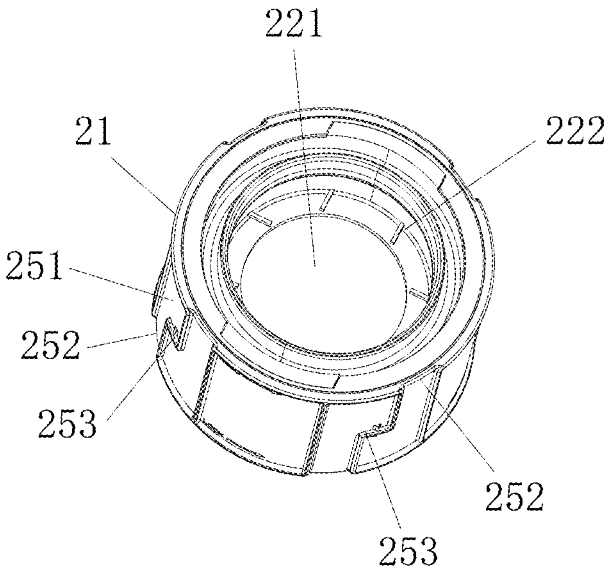
FIG. 3 is a three-dimensional view of the adapter component of the mason jar sealing device according to an embodiment of the present utility model.

FIG. 1 to FIG. 3 show a first embodiment of a mason jar sealing device according to the present utility model. As shown in FIG. 1 and FIG. 2, the mason jar sealing device includes a main machine 1 and an adapter component 2. A separation plate 11 is provided in the main machine 1. The separation plate 11 has an accommodating cavity 12 on one side and a sleeve 13 on the other side. A vacuum pump 121 is provided in the accommodating cavity 12. A through hole 111 is provided in the separation plate 11, and the through hole 111 is connected to an extraction tube (not shown) of the vacuum pump 121. The separation plate 11 is provided with a peripheral bone 112 and an inner peripheral bone 113 arranged concentrically on the side of the sleeve 13, and the through hole 111 is located within a range surrounded by the inner peripheral bone 113. As shown in FIG. 2, the adapter component 2 includes a straight cylindrical bracket 21 whose both ends are pluggably fixed in the sleeve 13. A first opening 211 and a second opening 212 are respectively provided at the two ends of the bracket 21. An annular separator plate 22 is further provided in the bracket 21. The first opening 211 and the second opening 212 are respectively located on two sides of the annular separator plate 22 and can both be mounted at a mouth of a mason jar. To ensure sealing of the adapter component 2 after it is connected to the main machine 1, a first sealing structure is provided on the first opening 211, and a second sealing structure is provided on the second opening 212. When the first opening 211 is inserted into the sleeve 13, the first sealing structure surrounds the peripheral bone 112, and the second sealing structure is in close contact with an external thread of the mouth of the mason jar. In this case, a space above the mouth is a closed sealed space. After the vacuum pump 121 is started, air inside the mason jar is drawn out from gaps around a bottle top and is drawn away by the vacuum pump 121 through the sealed space above the mouth. Similarly, when the second opening 212 is inserted into the sleeve 13, the second sealing structure surrounds the inner peripheral bone 113, and the first sealing structure is in close contact with the external thread of the mouth of the mason jar. In this case, a space above the mouth is a closed sealed space. After the vacuum pump 121 is started, air inside the mason jar is drawn out from gaps around the bottle top and is drawn away by the vacuum pump 121 through the sealed space above the mouth. There are usually two types of mason jars: one of a small mouth diameter and one of a large mouth diameter. In this case, the openings at the two ends of the straight cylindrical bracket 21 of the adapter component 2 are respectively adapted to mouths of mason jars of different mouth diameters. Therefore, the mason jar sealing device of this embodiment is capable of sealing and evacuating mason jars of different mouth diameters. That is, the sealing structures at the two ends of the adapter component 2 of the mason jar sealing device of the present utility model each not only can seal the mouth of the mason jar during air extraction, but also can be sealed with the sleeve 13 in the main machine 1 to form a closed space, thus achieving sealing of the mason jar by causing an air pressure difference between inside and outside of the bottle.

In addition, due to the arrangement of the annular separator plate 22 in the straight cylindrical bracket 21 of the adapter component 2, when a bottle top of a mason jar is stuck in the adapter component 2 by an operational error, the bottle top can be directly removed from an opposite side of the annular separator plate 22 by hand without the help of any tool, which is convenient and safe to use.

To ensure easy removal of a mouth accidentally stuck in the adapter component 2, as shown in FIG. 2 and FIG. 3, a size of an annular opening 221 in the middle of the annular separator plate 22 is slightly smaller than a size of a bottle top used for sealing the mouth of the mason jar. In this case, in actual use, as the closed sealed space above the bottle top may communicate with the vacuum pump 121 through the through hole 111 in the separation plate 11, the arrangement of the annular opening 221 does not affect extraction of air inside the mason jar and does not block the removal of the accidentally stuck bottle top.

As shown in FIG. 2 and FIG. 3, a plurality of ribs 222 at equal intervals are provided on two side surfaces of the annular separator plate 22. The ribs 222 are divergently provided to an outer periphery and centered on a center of the annular opening 221. During actual application, when the annular separator plate 22 covers the mouth of the mason jar, the ribs 222 abut against the bottle top tightly as a support, facilitating evacuation of the air inside the jar and causing an air pressure difference between the inside of the jar and the sealed space above the bottle top, thereby achieving sealing of the mason jar.

Embodiment 2

Figure 4:
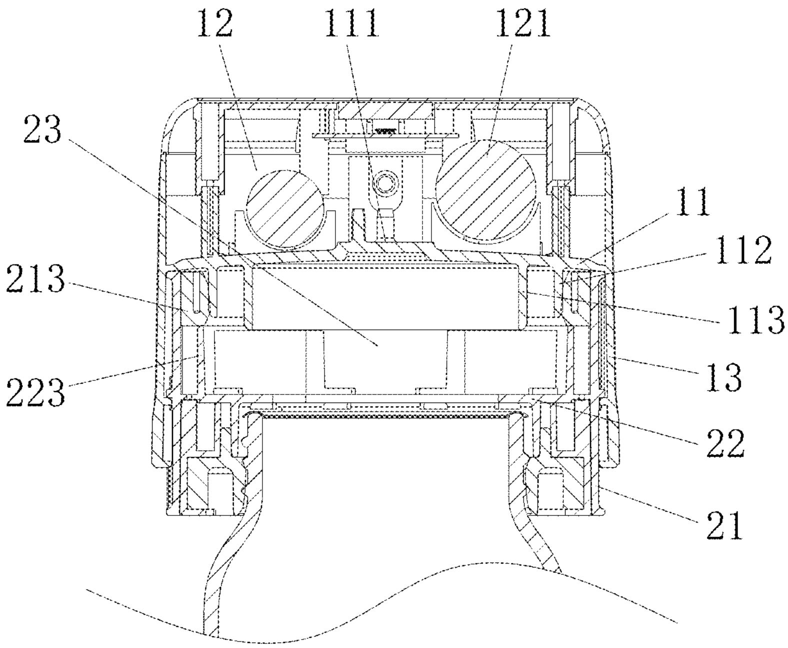
FIG. 4 is a schematic diagram illustrating connection of the mason jar sealing device to a mason jar of a small mouth diameter according to Embodiment 2 of the present utility model.

FIG. 1 to FIG. 4 show a second embodiment of the mason jar sealing device according to the present utility model. As shown in FIG. 4, the annular separator plate 22 in this embodiment is provided with a first support member 223 on a side of the first opening 211. The first sealing structure includes a first sealing ring 213. The first sealing ring 213 is fixed to the first support member 223, and the first sealing ring 213 is in close contact with an inner wall of the first opening 211. When the first opening 211 is inserted into the sleeve 13, the first sealing ring 213 surrounds the peripheral bone 112, the separation plate 11, the peripheral bone 112, the first sealing ring 213, the first support member 223, and the annular separator plate 22 jointly form a first cavity 23, and the first cavity 23 is in communication with the annular opening 221. In this case, the second sealing structure is in close contact with the external thread of the mouth of the mason jar. That is, the mason jar sealing device is used for sealing a mason jar of a small mouth diameter. When the vacuum pump 121 is started, the air inside the jar overflows around the bottle top, passes above the bottle top, enters the first cavity 23 through the annular opening 221 of the annular separator plate 22, and is then drawn out by the vacuum pump 121 through the through hole 111 in the separation plate 11. It may be understood that to achieve a favorable sealing effect, the first sealing ring 213 may be provided as a sealing ring with a groove.

Embodiment 3

Figure 5:
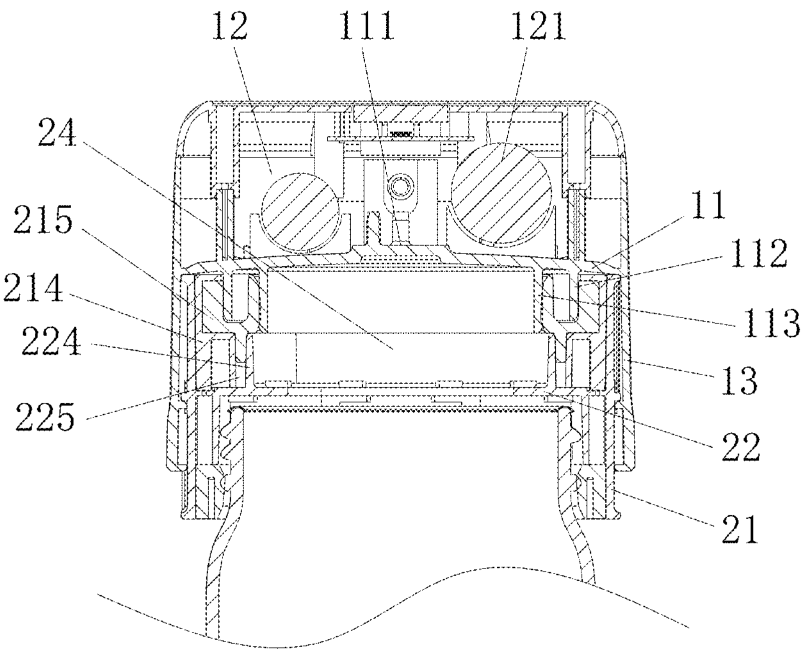
FIG. 5 is a schematic diagram illustrating connection of the mason jar sealing device to a mason jar of a large mouth diameter according to Embodiment 3 of the present utility model.

FIG. 1 to FIG. 6 show a third embodiment of the mason jar sealing device according to the present utility model. As shown in FIG. 5, the annular separator plate 22 in this embodiment is provided with a second support member 224 on a side of the second opening 212. A mounting groove 225 is formed between the second support member 224 and an inner wall of the bracket 21. The second sealing structure includes a pressure retaining member 214 and a second sealing ring 215. The pressure retaining member 214 is provided in the mounting groove 225 and in close contact with an inner wall of the second opening 212. The second sealing ring 215 is fixed to an inner wall of the pressure retaining member 214. When the second opening 212 is inserted into the sleeve 13, the second sealing ring 215 surrounds the inner peripheral bone 113, the separation plate 11, the inner peripheral bone 113, the second sealing ring 215, the second support member 224, and the annular separator plate 22 jointly form a second cavity 24, and the second cavity 24 is in communication with the annular opening 221. In this case, the first sealing structure is in close contact with the external thread of the mouth of the mason jar. That is, the mason jar sealing device is used for sealing a mason jar of a large mouth diameter. Different from Embodiment 2, during the sealing of the mouth of the mason jar of the large mouth diameter, the second opening 212 of the bracket 21 needs to maintain overall stability and sealing of the straight cylindrical bracket 21 during its insertion into the sleeve 13. Therefore, the pressure retaining member 214 needs to be provided to fix the second sealing ring 215.

Figure 6:
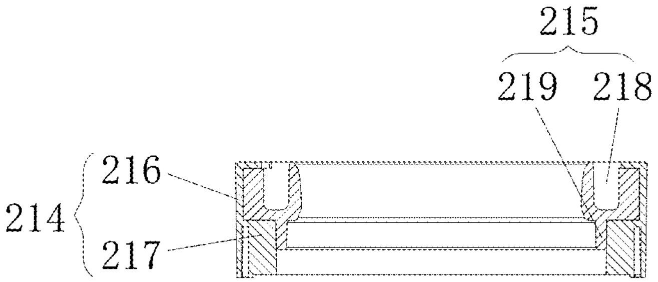
FIG. 6 is a schematic diagram of a second sealing structure in Embodiment 3 of the present utility model.

As shown in FIG. 6, the pressure retaining member 214 includes a housing 216 and a step 217 provided on an inner side of the housing 216. The second sealing ring 215 is provided with a groove 218. A sealing strip 219 extends outward from a bottom of the groove 218. The second sealing ring 215 is provided on the step 217. The groove 218 has one side in close contact with the inner side of the housing 216 and the other side surrounding the inner peripheral bone 113. The sealing strip is embedded in the mounting groove 225 together with an inner side of the step 217 after coming in close contact therewith. When the vacuum pump 121 is started, the air inside the jar overflows around the bottle top, passes above the bottle top, enters the second cavity 24 through the annular opening 221 of the annular separator plate 22, and is then drawn out by the vacuum pump 121 through the through hole 111 in the separation plate 11.

In the foregoing embodiment, for ease of actual use, an axial length of the straight cylindrical bracket 21 is greater than a depth of insertion into the sleeve 13, making it easier for a user to hold the adapter component 2 and facilitating mounting and fixing. Moreover, the adapter component 2 and the main machine 1 may be connected in various manners. In this embodiment of the present utility model, the adapter component 2 and the main machine 1 are fixed by means of sleeving and camping. Specifically, as shown in FIG. 1 and FIG. 3, a guide stopper 131 is provided on an inner wall of the sleeve 13, a mounting rail 251 is provided on an outer wall of the bracket 21, and the bracket 21 is fixedly inserted into the sleeve 13 through engagement between the mounting rail 251 and the guide stopper 131. In addition, because the two ends of the adapter component 2 are respectively adapted to mason jars of different mouth diameters, the mounting rail 251 on the outer wall of the bracket 21 needs to be centrally and symmetrically arranged. That is, as shown in FIG. 3, the mounting rail 251 is provided with an inlet 252 on an outer wall at each of the two ends of the bracket 21, and a bend 253 is provided in the middle of the mounting rail 251. When the bracket 21 is inserted into the sleeve 13, the guide stopper 131 slides in along the inlet and rotates to and fixed at the bend 253.

The mason jar sealing device of the present utility model is provided with an adapter component 2. The adapter component 2 includes a straight cylindrical bracket 21 whose both ends are pluggably fixed in a sleeve 13 of a main machine 1. An annular separator plate 22 is provided in the bracket 21. An opening is provided at each of the two ends of the bracket 21. The openings are respectively arranged on two sides of the annular separator plate 22. In addition, the openings at the two ends are each provided with a sealing structure. The sealing structure can be sealed with the sleeve 13. The two ends of the adapter component 2 can both be mounted at a mouth of a mason jar, and parts connected to the main machine 1 can form a sealed space. Therefore, mason jars of different mouth diameters can be sealed and evacuated. In addition, due to the arrangement of the annular separator plate 22 in the straight cylindrical bracket 21 of the adapter component 2, when a bottle top of a mason jar is stuck in the adapter component 2 by an operational error, the bottle top can be directly removed from an opposite side of the annular separator plate 22 by hand without the help of any tool, which is convenient and safe to use.

Apparently, the foregoing embodiments of the present utility model are merely examples for clearly describing the present utility model rather than limiting implementations of the present utility model. A person of ordinary skill in the art may make changes or variations in other different forms based on the foregoing descriptions. It is not necessary and impossible to enumerate all implementations herein. Any modification, equivalent replacement, improvement, and the like made within the spirit and the principle of the present utility model should fall within the protection scope of the claims of the present utility model.

What is claimed is:

1. A mason jar sealing device, comprising a main machine and an adapter component, wherein a separation plate is provided in the main machine, the separation plate has an accommodating cavity on one side and a sleeve on the other side, a vacuum pump is provided in the accommodating cavity, a through hole is provided in the separation plate, and the through hole is connected to an extraction tube of the vacuum pump, wherein the separation plate is provided with a peripheral bone and an inner peripheral bone arranged concentrically on the side of the sleeve, and the through hole is located within a range surrounded by the inner peripheral bone;

the adapter component comprises a straight cylindrical bracket whose both ends are pluggably fixed in the sleeve, a first opening and a second opening are respectively provided at the two ends of the bracket, an annular separator plate is provided in the bracket, and the first opening and the second opening are respectively located on two sides of the annular separator plate and can both be mounted at a mouth of a mason jar; and a first sealing structure is provided on the first opening, and a second sealing structure is provided on the second opening; when the first opening is inserted into the sleeve, the first sealing structure surrounds the peripheral bone, and the second sealing structure is in close contact with an external thread of the mouth of the mason jar; and when the second opening is inserted into the sleeve, the second sealing structure surrounds the inner peripheral bone, and the first sealing structure is in close contact with the external thread of the mouth of the mason jar.

2. The mason jar sealing device according to claim 1, wherein a size of an annular opening in the middle of the annular separator plate is slightly smaller than a size of a bottle top used for sealing the mouth of the mason jar.

3. The mason jar sealing device according to claim 2, wherein a plurality of ribs at equal intervals are provided on two side surfaces of the annular separator plate, and the ribs are divergently provided to an outer periphery and centered on a center of the annular opening.

4. The mason jar sealing device according to claim 3, wherein the annular separator plate is provided with a first support member on a side of the first opening, the first sealing structure comprises a first sealing ring, the first sealing ring is fixed to the first support member, and the first sealing ring is in close contact with an inner wall of the first opening; and when the first opening is inserted into the sleeve, the first sealing ring surrounds the peripheral bone, the separation plate, the peripheral bone, the first sealing ring, the first support member, and the annular separator plate jointly form a first cavity, and the first cavity is in communication with the annular opening.

5. The mason jar sealing device according to claim 3, wherein the annular separator plate is provided with a second support member on a side of the second opening, a mounting groove is formed between the second support member and an inner wall of the bracket, the second sealing structure comprises a pressure retaining member and a second sealing ring, the pressure retaining member is provided in the mounting groove and in close contact with an inner wall of the second opening, and the second sealing ring is fixed to an inner wall of the pressure retaining member; and when the second opening is inserted into the sleeve, the second sealing ring surrounds the inner peripheral bone, the separation plate, the inner peripheral bone, the second sealing ring, the second support member, and the annular separator plate jointly form a second cavity, and the second cavity is in communication with the annular opening.

6. The mason jar sealing device according to claim 5, wherein the pressure retaining member comprises a housing and a step provided on an inner side of the housing, the second sealing ring is provided with a groove, a sealing strip extends outward from a bottom of the groove, the second sealing ring is provided on the step, the groove has one side in close contact with the inner side of the housing and the other side surrounding the inner peripheral bone, and the sealing strip is embedded in the mounting groove together with an inner side of the step after coming in close contact therewith.

7. The mason jar sealing device according to claim 1, wherein an axial length of the straight cylindrical bracket is greater than a depth of insertion into the sleeve.

8. The mason jar sealing device according to claim 1, wherein a guide stopper is provided on an inner wall of the sleeve, a mounting rail is provided on an outer wall of the bracket, and the bracket is fixedly inserted into the sleeve through engagement between the mounting rail and the guide stopper.

9. The mason jar sealing device according to claim 8, wherein the mounting rail is provided with an inlet on an outer wall at each of the two ends of the bracket, a bend is provided in the middle of the mounting rail, and when the bracket is inserted into the sleeve, the guide stopper slides in along the inlet and rotates to and fixed at the bend.

* * * * *